US008467753B2

(12) United States Patent
Carrera et al.

(10) Patent No.: US 8,467,753 B2
(45) Date of Patent: Jun. 18, 2013

(54) RECEIVER AND METHOD FOR RECEIVING A FIRST USABLE FREQUENCY BAND AND A SECOND USABLE FREQUENCY BAND

(75) Inventors: Alfonso Carrera, San Sebastian (DE); Stefan Koehler, Nuremberg (DE); Guenter Rohmer, Erlangen (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 882 days.

(21) Appl. No.: 12/306,295

(22) PCT Filed: Jun. 25, 2007

(86) PCT No.: PCT/EP2007/005617
§ 371 (c)(1),
(2), (4) Date: Jan. 22, 2009

(87) PCT Pub. No.: WO2008/000428
PCT Pub. Date: Jan. 3, 2008

(65) Prior Publication Data
US 2010/0048157 A1    Feb. 25, 2010

(30) Foreign Application Priority Data
Jun. 27, 2006    (DE) .................... 10 2006 029 482

(51) Int. Cl.
*H04B 1/18*  (2006.01)
(52) U.S. Cl.
USPC ................. 455/188.1; 455/129.1; 455/168.1; 455/333
(58) Field of Classification Search
USPC ..................................................... 455/188.1
See application file for complete search history.

(56) References Cited

U.S. PATENT DOCUMENTS

| 5,493,721 A | | 2/1996 | Reis |
| 5,708,596 A | * | 1/1998 | Sato ............................ 708/313 |
| 5,805,108 A | | 9/1998 | Lennen |
| 6,038,248 A | | 3/2000 | Rabaeijs et al. |

(Continued)

FOREIGN PATENT DOCUMENTS

DE    41 04 882 A1    8/1992

OTHER PUBLICATIONS

A Low-Power RF Front-End Architecture for an L1/L2CS GPS Receiver Frederic Chasteltain, Cyril Bottcron, Pierre-Andre Farine Institute of Microtechnoiogy ( IMT), University of Neuchatel, Switzerlan Sep. 13-16, 2005, Long Beach, CA.*

(Continued)

*Primary Examiner* — Ajibola Akinyemi
(74) *Attorney, Agent, or Firm* — Keating & Bennett, LLP

(57) ABSTRACT

A receiver for receiving a first usable frequency band and a second usable frequency band includes a band-pass filter device for filtering one or several receiving signals, a mixer device for converting the combination signal or the first band-pass filter signal and the second band-pass filter signal with a local oscillator signal, for obtaining a first intermediate frequency signal and a second intermediate frequency signal, and an intermediate frequency filter device for filtering the first intermediate frequency signal and the second intermediate frequency signal. Further, the receiver includes an analog/digital converter device for analog/digital converting the first filtered intermediate frequency signal and the second filtered intermediate frequency signal by using a single sampling frequency for obtaining a first digitized intermediate frequency signal and a second digitized intermediate frequency signal.

23 Claims, 7 Drawing Sheets

U.S. PATENT DOCUMENTS

| | | | |
|---|---|---|---|
| 6,243,430 | B1 | 6/2001 | Mathe |
| 7,903,772 | B2 * | 3/2011 | Jensen .......................... 375/350 |
| 2002/0161522 | A1 | 10/2002 | Cohen et al. |
| 2002/0173337 | A1 * | 11/2002 | Hajimiri et al. ............... 455/552 |
| 2004/0102172 | A1 | 5/2004 | Hendin |

OTHER PUBLICATIONS

Official communication issued in counterpart International Application No. PCT/EP2007/005617, mailed on Oct. 30, 2007.

Chastellain et al.: "A Low-Power RF Front-End Architecture for an LI/L2CS GPS Receiver," XP-002454344; ION GNSS 18th International Technical Meeting of the Satellite Division; Sep. 2005; pp. 628-634.

Hashemi et al.: "Concurrent Dual-Band CMOS Low Noise Amplifiers and Receiver Architectures," 2001 Symposium on VLSI Circuits Digest of Technical Papers; 2001;pp. 247-250.

Ko et al.: "A 19-mW 2.6mmΛ2 L1/L2 Dual-Band CMOS GPS Receiver," IEEE Journal of Solid-State Circuits; vol. 40, No. 7; Jul. 2005; pp. 1414-1425.

Dreher et al.: "Planar Digital-Beamforming Antenna for Satellite Navigation," 1999 IEEE MTT-S Digest; 1999; pp. 647-650.

Mirabbasi et al.: "Hierarchical QAM: A Spectrally Efficient DC-Free Modulation Scheme," IEEE Communications Magazine; Nov. 2000; pp. 140-145.

Martin: "Complex Signal Processing Is Not Complex," IEEE Transactions on Circuits and Systems-I: Regular Papers; vol. 51, No. 9; Sep. 2004; pp. 1823-1836.

Carrera et al,: "Signal Processor and Method for Processing a Receiving Signal," U.S. Appl. No. 12/305,689, filed Dec. 19, 2008.

\* cited by examiner

RECEIVER AND METHOD FOR RECEIVING A FIRST USABLE FREQUENCY BAND AND A SECOND USABLE FREQUENCY BAND

BACKGROUND OF THE INVENTION

The present invention relates generally to a receiver and a method for receiving a first usable frequency band and a second usable frequency band, in particular to a broadband Low-IF dual receiver.

In many fields of communication technology, for example in satellite-aided positioning, it is desirable to be able to receive several usable frequency bands simultaneously or at least alternately in time. Apart from this, it is desirable, in particular in portable devices, to realize a circuit structure that is as simple as possible and a low power consumption.

Dual receivers allow the simultaneous reception of two different bands by a single receiver, which saves power consumption and costs.

In positioning, it can, for example, be necessitated to receive two bands of a navigation system (e.g. an L1-band and an L2c-band of the GPS-satellite navigation system, or an L5-band and an L6-band of the Galileo satellite navigation system) simultaneously. Also, simultaneous reception of bands of different systems can be desirable.

In the currently used receivers for the above described applications, there are two different groups: very broadband receivers and relatively narrow band receivers or dual receivers, respectively. Both cases are high-precision receivers for high-end navigation and positioning systems.

In a first type of receivers, high-precision is obtained by a large bandwidth of the transmission method DSSS (direct-sequence spread spectrum), wherein the bandwidth is, for example, between 20 MHz and 70 MHz or even more. Processing such a high bandwidth is a large challenge for the receiver. In particular, filtering and its group run time change in the pass band, cutoff frequency of a variable gain amplifier (also referred to as VGA) and a sampling rate of an analog/digital converter (also referred to as ADC) are affected. Due to the high cutoff frequency, an anti-aliasing filter is passively implemented. Further, due to the high cutoff frequency, the variable gain amplifier and the analog/digital converter (ADC) consume comparatively much current.

In a second type of receivers, high accuracy is obtained by simultaneously receiving two bands. This method compensates, among other things, an ionospheric group run time change (a negative influence variable in navigation systems) by measuring two delays from two different carrier frequencies.

SUMMARY

According to an embodiment, a receiver for receiving a first usable frequency band and a second usable frequency band, wherein the usable frequency bands are spaced apart, may have: a band-pass filter device for filtering one or several receiving signals, wherein the band-pass filter device is implemented to provide a combination signal having the first usable frequency band and the second usable frequency band; a mixer device for converting the combination signal with a local oscillator signal, whose frequency is selected such that the first usable frequency band and the second usable frequency band are at least partly image bands of each other with regard to the frequency of the local oscillator signal, for obtaining a first intermediate frequency signal and a second intermediate frequency signal; an intermediate frequency filter device for filtering the first intermediate frequency signal and the second intermediate frequency signal for obtaining a first filtered intermediate frequency signal and a second filtered intermediate frequency signal; and an analog/digital converter for analog/digital converting the first filtered intermediate frequency signal and the second filtered intermediate frequency signal by using a single sampling frequency for obtaining a first digitized intermediate frequency signal and a second digitized intermediate frequency signal), wherein the mixer device is implemented to mix the combination signal with the local oscillator signal for obtaining an inphase intermediate frequency signal as the first intermediate frequency signal, which is based on the combination signal, and in which information contents of the first usable frequency band and the second usable frequency band at least partly spectrally overlap, and for obtaining a quadrature intermediate frequency signal as the second intermediate frequency signal, which is based on the combination signal, and in which information contents of the first usable frequency band and the second usable frequency band at least partly spectrally overlap; and wherein the receiver further has a separation device, having: an inphase/quadrature splitting device, which is implemented to determine an associated inphase portion and an associated quadrature portion based on the first digitized intermediate frequency signal, and to determine an associated inphase portion and an associated quadrature portion based on the second digitized intermediate frequency signal; a first combiner, which is implemented to combine the inphase portion of the first digitized intermediate frequency signal with the quadrature portion of the second digitized intermediate frequency signal with same signs, for obtaining a quadrature-output signal substantially comprising the information content of the first usable frequency band; a second combiner, which is implemented to combine the quadrature portion of the first digitized intermediate frequency signal with the inphase portion of the second digitized intermediate frequency signal with same signs, for obtaining an inphase-output signal substantially comprising the information content of the second usable frequency band; a third combiner, which is implemented to combine the quadrature portion of the first digitized intermediate frequency signal with the inphase portion of the second digitized intermediate frequency signal with opposite signs, for obtaining an inphase-output signal substantially comprising the information content of the first usable frequency band; and a fourth combiner, which is implemented to combine the inphase portion of the first digitized intermediate frequency signal with the quadrature portion of the second digitized intermediate frequency signal with opposite signs, for obtaining a quadrature output signal substantially comprising the information content of the second usable frequency band), wherein the receiver is implemented such that the analog/digital converter device performs subsampling and that frequency conversion is performed by the subsampling.

According to another embodiment, a method for receiving a first usable frequency band and a second usable frequency band, wherein the usable frequency bands are spaced apart, may have the steps of: band-pass filtering of one or several receiving signals for providing a combination signal having the first usable frequency band and the second usable frequency band; converting the combination signal with a local oscillator signal, whose frequency is selected such that the first usable frequency band and the second usable frequency band are at least partly image bands of each other with regard to the frequency of the local oscillator signal, for obtaining a first intermediate frequency signal and a second intermediate frequency signal; filtering the first intermediate frequency signal and the second intermediate frequency signal for obtaining a first filtered intermediate frequency signal and a second filtered intermediate frequency signal; and analog/digital converting the first filtered intermediate frequency signal and the second filtered intermediate frequency signal by using a single sampling frequency for obtaining a first digitized intermediate frequency signal and a second digitized intermediate frequency signal), wherein analog/digital converting includes subsampling, such that frequency conversion is performed by the subsampling; wherein converting the combination signal with the local oscillator signal includes mixing the combination signal with the local oscillator signal, for obtaining an inphase intermediate frequency signal as the first intermediate frequency signal, which is based on the combination signal, and in which information contents of the first usable frequency band and the second usable frequency band at least partly spectrally overlap, and for obtaining a quadrature intermediate frequency signal as the second intermediate frequency signal, which is based on the combination signal, and in which information contents of the first usable frequency band and the second usable frequency band at least partly spectrally overlap; and the method may have the following further steps: combining the inphase portion of the first digitized intermediate frequency signal with the quadrature portion of the second digitized intermediate frequency signal with same signs, for obtaining a quadrature-output signal substantially comprising the information content of the first usable frequency band; combining the quadrature portion of the first digitized intermediate frequency signal with the inphase portion of the second digitized intermediate frequency signal with same signs for obtaining an inphase-output signal, substantially comprising the information content of the second usable frequency band; combining the quadrature portion of the first digitized intermediate frequency signal with the inphase portion of the second digitized intermediate frequency signal with opposite signs, for obtaining an inphase-output signal substantially comprising the information content of the first usable frequency band; and combining the inphase portion of the first digitized intermediate frequency signal with the quadrature portion of the second digitized intermediate frequency signal with opposite signs, for obtaining a quadrature-output signal substantially comprising the information content of the second usable frequency band.

It is the central idea of the present invention that a particularly efficient receiver structure results by converting a combination signal comprising both usable frequency bands or two individual band-pass filter signals, of which a first band-pass filter signal comprises information content of the first usable frequency band, and a second band-pass filter signal comprises information content of the second usable frequency band, in a mixer device by using a local oscillator signal, the frequency of which is selected such that the first usable frequency band and the second usable frequency band are at least partly image bands of each other with regard to the frequency of the local oscillator signal. In other words, the frequency of the local oscillator signal used by the mixer device is equal to an average value of a first carrier frequency in the first usable frequency band and a second carrier frequency in the second usable frequency band. Thus, the two usable frequency bands are imaged to at least partly overlapping frequency ranges representing a common intermediate frequency band for the two usable frequency bands. The two intermediate frequency signals generated by the mixer device can thus be filtered in a particularly efficient manner with an intermediate frequency filter device.

Since the two usable frequency bands are imaged to substantially the same or at least overlapping intermediate frequency bands, the two intermediate frequency signals can be sampled in a particularly efficient manner with analog/digital converters, when a sampling frequency selected for sampling the first intermediate frequency signal is equal to a sampling frequency selected for sampling the second intermediate frequency signal. In other words, due to the fact that the two intermediate frequency bands are imaged to the same or at least to overlapping frequency ranges, due to the inventive selection of the frequency of the local oscillator signal, the analog/digital converters can both be operated at the same sampling frequency, without generating an unnecessarily large amount of information at the outputs of the analog/digital converters.

Further, due to the inventive concept, merely a single frequency synthesizer is necessitated for generating the local oscillator signal, wherein still the simultaneous reception of two usable frequency bands is enabled. This significantly saves resources (with regard to circuit effort and power consumption) compared to conventional approaches, where two separate local oscillator signals of different frequency are used for converting the first usable frequency band and the second usable frequency band.

Further, the inventive selection of the frequency of the local oscillator, allows that the intermediate frequency filter device for filtering the first intermediate frequency signal and the second intermediate frequency signal can consist of two similar branches, since both the first usable frequency band and the second usable frequency band are imaged to the same or at least to overlapping intermediate frequency ranges. This results in a simplified circuit design and reduced production costs.

Analog/digital conversion can be performed with the same sampling frequencies for both intermediate frequency signals, without generating an unnecessary large amount of information.

Further, image frequency suppression is eased or improved, respectively, by the inventive selection of the frequency of the first local oscillator signal, by the fact that the two usable frequency bands are image bands of each other. Thus, only the two usable frequency bands have to be separated from each other. Additional image frequencies to be suppressed do not occur when mixing by the mixer device.

Claim 6 defines a particularly advantageous embodiment of the present invention. According to an aspect of the present invention, it has been found out that it is advantageous to perform frequency conversion within a first frequency conversion or a first mixer, respectively, which means the mixer device, such that two usable frequency bands included in a combination signal are imaged in the first intermediate frequency signal, which is an inphase signal, and in the second intermediate frequency signal, which is a quadrature signal, to at least partly spectrally overlapping frequencies.

It has been found out that separating the information content of the first usable frequency band and the second usable frequency band can be performed after generating the first digitized intermediate frequency signal from the first intermediate frequency signal and generating the second digitized intermediate frequency signal from the second intermediate frequency signal during digital signal processing of the digitized intermediate frequency signals. In other words, it has been found out that despite the simplification resulting from using a single local oscillator signal which lies, for example, centrally or symmetrically, respectively, between the usable frequency bands, efficient separation of the information content of the usable frequency bands is possible by using an intermediate frequency filter device having two substantially identical filters for the first intermediate frequency signal and the second intermediate frequency signal, and by using analog/digital converters operated by a single identical sampling frequency.

Further, the mentioned approach allows the usage of a single dual band antenna, which is implemented to receive the two usable frequency bands, a single band-pass filter device downstream of the antenna as well as a single low noise amplifier for generating the combination signal. This results in a circuit structure having particularly few elements, which allows using a particularly low common sampling frequency for the analog/digital converters, and which further allows separation of the information content of the usable frequency bands by digitally processing the digitized intermediate frequency signals.

Further particularly advantageous embodiments of the present invention are defined by claims 14 and 15. According to an aspect of the present invention, the above mentioned implementation realizes a concept according to which the analog/digital converters perform frequency conversion by subsampling. The first intermediate frequency signal passed on by the intermediate frequency filter device from the mixer device to the analog/digital converter comprises merely frequency portions in the frequency interval [N·$f_S$; (N+½) $f_S$]. The mentioned frequency interval is imaged to the frequency interval [0; $f_S$/2] by sampling with the sampling frequency $f_S$. Thus, the analog/digital converter fulfills the function of a frequency converter at the same time. Further, the intermediate frequency filter device fulfills the function of signal selection at the same time, as well as the function of an anti-aliasing filter for the analog/digital converter. Thus, a separate anti aliasing filter can be omitted. Further, the intermediate frequency filter device ensures image frequency suppression.

By the above-mentioned selection of the sampling frequency $f_S$, it is further ensured that precise generation of an inphase portion as well as a quadrature portion of the first digitized intermediate frequency signal and the second digitized intermediate frequency signal can be obtained.

Thus, by using the above-mentioned features, a receiver can be provided, where two analog intermediate frequency signals, an inphase signal and a quadrature signal, are generated by an analog mixer device. The respective analog intermediate frequency signals are then band-pass filtered. By subsampling by the analog/digital converters, frequency conversion is performed, which results in a first digitized intermediate frequency signal and a second digitized intermediate frequency signal. The digitized intermediate frequency signals can then be split in inphase portions and quadrature portions by respective quadrature sampling, which can be used for separating the information content of the usable frequency bands.

Further, the present invention provides a method for receiving a first usable frequency band at a first carrier frequency as well as a second usable frequency band at a second carrier frequency according to claim 22.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
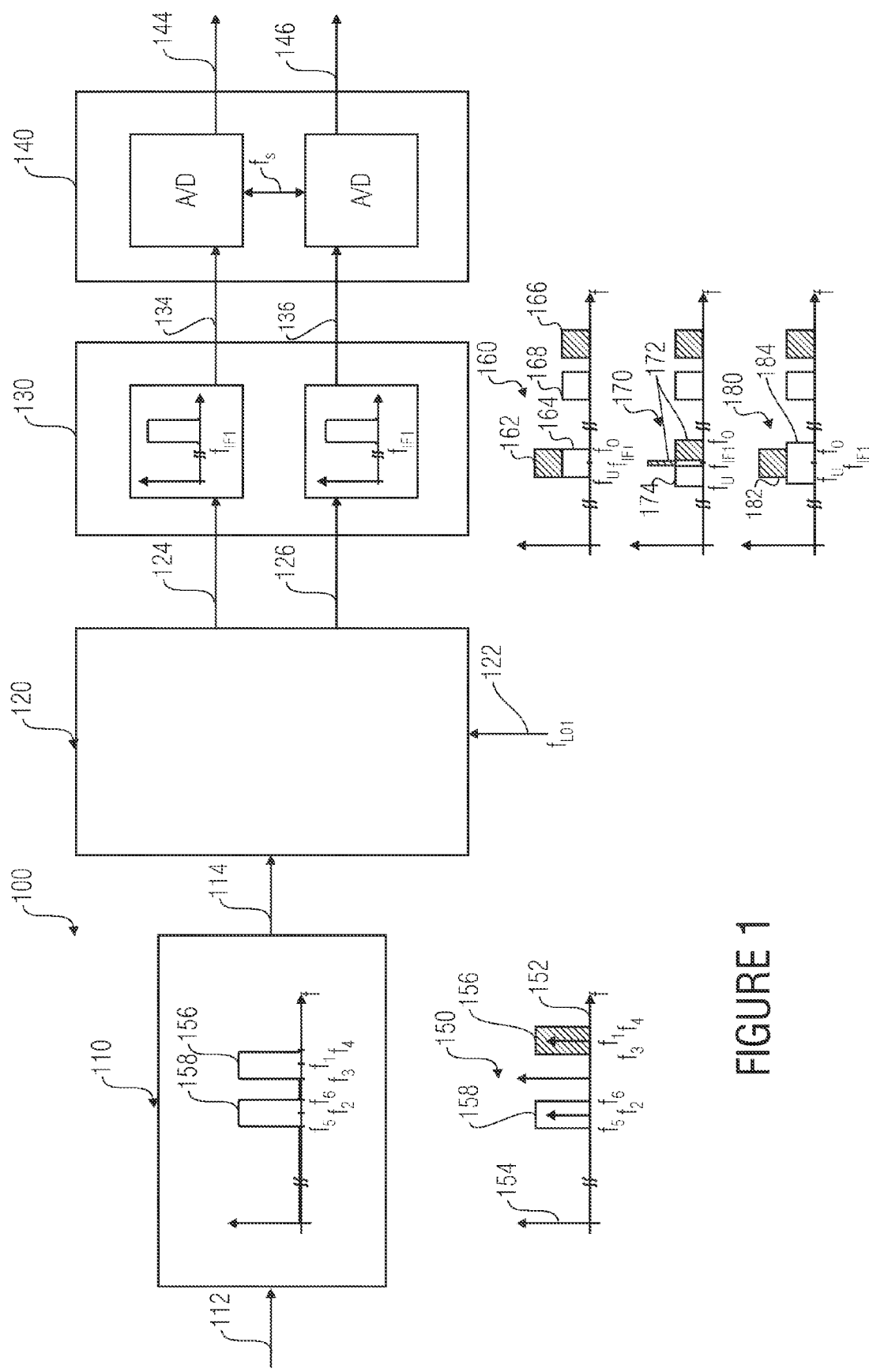
FIG. 1 is a block diagram of an inventive receiver according to an embodiment of the present invention.

FIG. 1 shows a block diagram of an inventive receiver according to an embodiment of the present invention. The receiver according to FIG. 1 is designated by 100 in its entirety. The receiver 100 comprises a band-pass filter device 110, which is implemented to receive a received signal 112. The band-pass filter device 110 (also referred to as band-pass filter 110 below) generates a combination signal 114 based on the receiving signal 112 and provides the same to a mixer device 120. Further, the mixer device 120 receives a local oscillator signal 122. The mixer device 120 provides a first intermediate frequency signal 124 as a first output signal, as well as a second intermediate frequency signal 126 as a second output signal. An intermediate frequency filter device 130 receives the first intermediate frequency signal 124 and the second intermediate frequency signal 126 and provides a first filtered intermediate frequency signal 134 as a first output signal, as well as a second filtered intermediate frequency signal as a second output signal 136. An analog/digital converter device 140 receives the first filtered intermediate frequency signal 134 and the second filtered frequency signal 136 and generates a first digitized intermediate frequency signal 144 as well as a second digitized intermediate frequency signal 146 by sampling with a sampling frequency $f_S$.

Based on the structural description, the mode of operation of the receiver 100 will be discussed in more detail below. It is assumed that the receiving signal 112 comprises two usable frequency bands. A spectral representation 150 shows an example of a spectrum of the receiving signal 112. A frequency is plotted on an abscissa 152, while, for example, a spectral power density is plotted on an ordinate 154. The spectral representation 150 shows a first usable frequency band 156, which extends from a lower frequency $f_3$ to an upper frequency $f_4$. A second usable frequency band 158 extends from a lower frequency $f_5$ to an upper frequency $f_6$. The first usable frequency band 156 is further spaced apart from the second usable frequency band 158. A first carrier frequency $f_1$ lies within the first usable frequency band 156, and, for example, a second carrier frequency $f_2$ lies within the second usable frequency band 158. The carrier frequencies $f_1$, $f_2$ define, for example, a band center of the usable frequency bands 156, 158. However, it is not necessitated that carriers are actually present in the carrier frequencies $f_1$, $f_2$. Rather, signals with distributed spectrum can be transmitted in the usable frequency bands 156, 158. In other words, the mentioned carrier frequencies $f_1$, $f_2$ merely serve for illustration purposes.

Further, the band-pass filter device 110 is implemented to pass the first usable frequency band 156 and the second usable frequency band 158. In other words, the band-pass filter device 110 is implemented to attenuate, for example, the first usable frequency band 156 and the second usable frequency band 158 not at all or comparatively weakly, and to attenuate a frequency range between the first usable frequency band 156 and the second usable frequency band 158, or to attenuate the same more than the usable frequency bands 156 and 158, respectively. Thus, the usable frequency bands are two separate pass bands of the band-pass filter device 110. The band-pass filter device 110 is further implemented to attenuate further frequency ranges adjacent to the usable frequency bands 156, 158 (or to attenuate them more than the usable frequency bands 156, 158, respectively).

Thus, a combination signal 114 results, which carries both the information content of the first usable frequency band 156 and the information content of the second usable frequency band 158. The mixer device 120 receives the combination signal 114 and is implemented to mix the combination signal 114 with the local oscillator signal 122. The frequency of the local oscillator signal 122 is selected such that the first usable frequency band 156 and the second usable frequency band 158 are fully or at least partly image bands of each other. In other words, the local oscillator signal 150 is selected such that the first usable frequency band 156 and the second usable frequency band 158 are imaged to overlapping frequency bands when mixing with the local oscillator signal 122.

If $f_3$ describes a lower frequency limit of the first usable frequency band 156, and $f_4$ an upper frequency limit of the first usable frequency band 156, and if further $f_5$ describes a lower frequency limit of the second usable frequency band 158 and $f_6$ an upper frequency limit of the second usable frequency band 158, the following holds: the frequency intervals $[f_3-f_{LO1}; F_4-f_{LO1}]$ and $[f_{LO1}-f_6; F_{LO1}-f_5]$ overlap. For that purpose, the frequency of the local oscillator signal 122 is selected between the usable frequency bands 156, 158. The frequency $f_{LO1}$ of the first local oscillator signal 122 is for example symmetrical between the first usable frequency band 156 and the second usable frequency band 158.

Thus, the mixer device 120 mixes the combination signal 114 including the two usable frequency bands 156, 158, with the local oscillator signal 122. This results in a first intermediate frequency signal 124 and a second intermediate frequency signal 126 result. A spectral representation 160 shows an example for the first intermediate frequency signal 124 or the second intermediate frequency signal 126 resulting from mixing by the mixer device 120. In the spectral representation 160, it is assumed that the first usable frequency band 156 and the second usable frequency band 158 have the same width, and that the frequency $f_{LO1}$ of the local oscillator signal is symmetrical between the usable frequency bands 156, 158. By mixing down, an image or down-mixed image 162, respectively, of the first usable frequency band 156 results. Further, a down-mixed image 164 of the second usable frequency band 158 results. The images 162, 164 of the usable frequency bands 156, 158 are in the same frequency range and extend, with regard to frequency, around a first intermediate frequency $f_{IF1}$. The first intermediate frequency $f_{IF1}$ can, for example, be defined as a center frequency of the images 162, 164.

Further, by the function of the mixer device 120, up-mixed images 166, 168 of the usable frequency bands 156, 158 result, which will not be relevant in the following, and which can further be removed or filtered out or suppressed, respectively, from the intermediate frequency signals 124, 126 by the intermediate frequency filter device 130.

A further spectral representation 170 shows the case where the frequency $f_{LO1}$ of the local oscillator 122 is not fully symmetrical between the usable frequency bands 156, 158. Images 172, 174 of the usable frequency bands 156, 158 overlap only partly in this case. The first intermediate frequency $f_{IF1}$ can, for example, be defined as a center frequency of an overlapping range where the images 172, 174 overlap, or at least as a frequency in the overlapping range.

A further spectral representation 180 shows images 182, 184 of the usable frequency bands 156, 158, resulting by mixing in the mixer device 120, wherein it is assumed that the first usable frequency band 156 is narrower than the second usable frequency band 158. Here exists also an overlapping range of the two images 182, 184, wherein it is assumed that the first intermediate frequency $f_{IF1}$ lies within the overlapping range.

The intermediate frequency filter device 130 receives, for example, the first intermediate frequency signal 124 and filters the first intermediate frequency signal 124 for obtaining a filtered first intermediate frequency signal 134. Here, the filter device 130 can either comprise a band-pass filter or low-pass filter, which is implemented to pass exactly one image 162, 172, 182 of the first usable frequency band 156 and further exactly one image 154, 174, 184 of the second usable frequency band 158, and to attenuate or block further images of the usable frequency bands 156, 158 resulting from mixing in the mixer device 120 (e.g. by up-mixing of resulting images 166, 168). Further, the intermediate frequency filter device 130 is implemented to obtain the second intermediate frequency signal 126 and to generate the second filtered intermediate frequency signal 136 based thereon. For that purpose, the filter device 130 includes, for example, a low-pass filter or a band-pass filter, which according to its mode of operation, corresponds to the filter used for generating the first filtered intermediate frequency signal 134 from the first intermediate frequency signal 124.

The analog/digital converter device 140 is further implemented to convert the intermediate frequency signals 134, 136 in an analog/digital manner, for obtaining the first digitized intermediate frequency signal 144 based on the first filtered intermediate frequency signal 134, and for obtaining the second digitized intermediate frequency signal 146 based on the second filtered intermediate frequency signal 146. Thereby, the analog/digital converter device is implemented to sample the first filtered intermediate frequency signal 134 and the second filtered intermediate frequency signal 136 with a common identical sampling frequency $f_S$. This is particularly advantageous since the images 162, 172, 182; 164, 174, 184 of the usable frequency bands 156, 158 overlap with regard to frequency. Thus, by sampling with a common sampling frequency, both information content of the first usable frequency band 156 and information content of the second usable frequency band 158 can be digitized in efficient manner.

Figure 2:
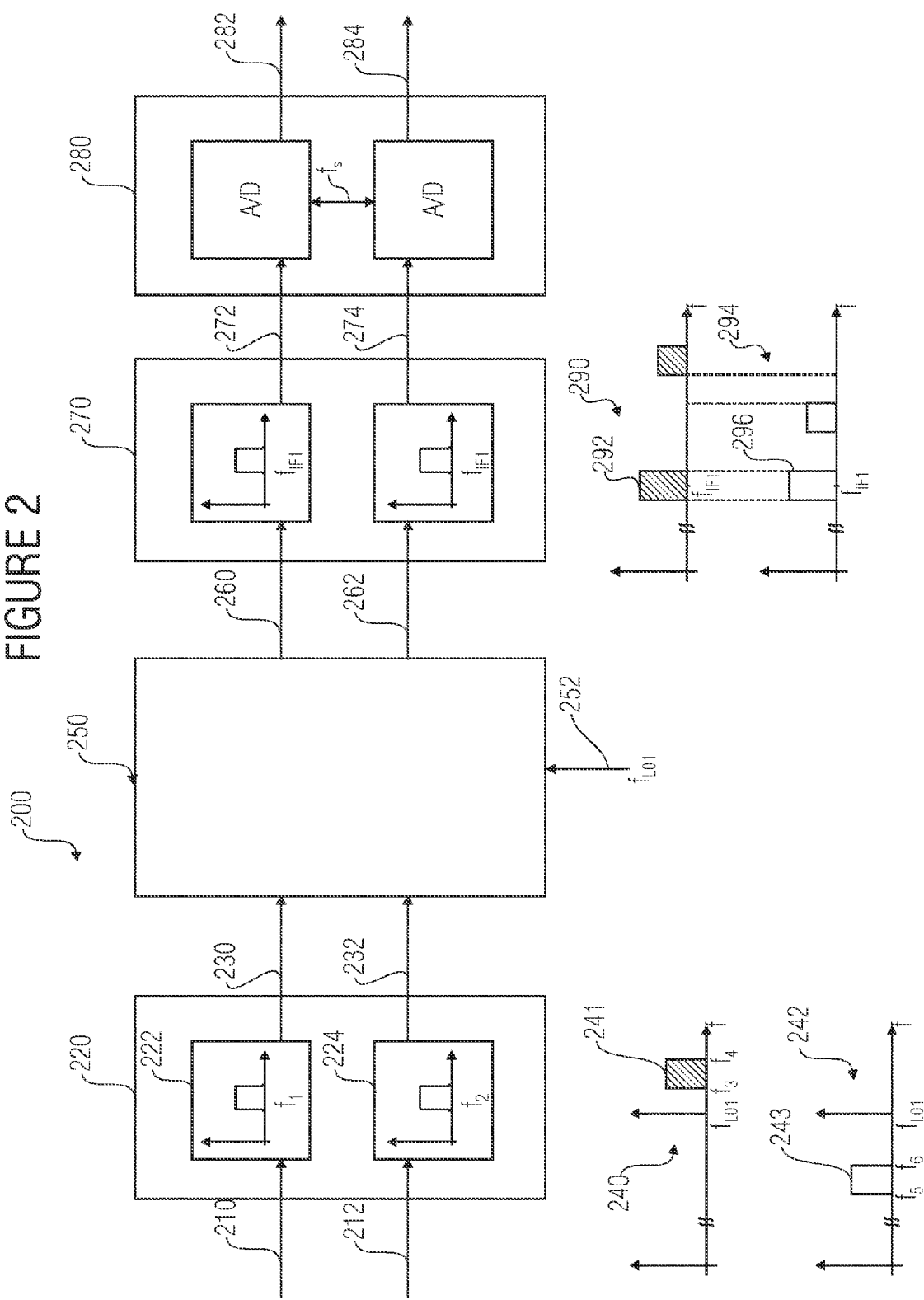
FIG. 2 is a block diagram of an inventive receiver according to an embodiment of the present invention.

FIG. 2 shows a block diagram of an inventive receiver according to an embodiment of the present invention. The receiver according to FIG. 2 is designated by 200 in its entirety.

The receiver 200 receives a first receiving signal 210 as well as a second receiving signal 212. A band-pass filter device 220 receives the first receiving signal 210 and the second receiving signal 212. The first receiving signal 210 and the second receiving signal 212 can originate, for example, from different antennas, one of which is optimized for the first usable frequency band and the other one for the second usable frequency band. The receiving signals 210, 212 can also be identical.

Here, it is possible that, for example, the first receiving signal 210 only comprises the first usable frequency band but not the second usable frequency band (or only in weakened form), or that the first receiving signal 210 comprises both the first usable frequency band and the second usable frequency band. Further, the second receiving signal 212 can comprise either only the second usable frequency band, but not the second usable frequency band (or only in weakened form), or both the first usable frequency band and the second usable frequency band.

The band-pass filter device 220 comprises a first band-pass filter 222, which is implemented to receive the first receiving signal 210, and to generate a first band-pass filter signal 230 based on the first receiving signal 210. Thereby, the first band-pass filter 222 is implemented to pass the first usable frequency band in an unattenuated manner or with little attenuation, and to attenuate or suppress, respectively, other frequency ranges surrounding the first usable frequency band. The first band-pass filter 222 is, for example, implemented to attenuate the second usable frequency band more than the first usable frequency band (for example by at least 10 dB, better by at least 20 dB). Thus, a first band-pass filter signal 230 results, which substantially comprises the first usable frequency band.

Further, the band-pass filter device 220 comprises a second band-pass filter 224, which is implemented to receive the second receiving signal 212, and to generate a second band-pass filter signal 232 based on the second receiving signal 212. The second band-pass filter 224 is implemented to pass the second usable frequency band (i.e. to attenuate the same not at all or only weakly) and to attenuate other frequency ranges surrounding the second usable frequency band more or to suppress the same, respectively. The second band-pass filter 224 is implemented to attenuate the first usable frequency band more than the second usable frequency band (by at least 10 dB, better by at least 20 dB). Thus, the second band-pass filter 232 substantially comprises the second usable frequency band.

A spectral representation 240 shows, for example, the first band-pass filter signal 230, wherein apart from the information content or spectral content, respectively, of the first band-pass filter signal 230, additionally the local oscillator signal of the frequency $f_{LO1}$ is entered. A further spectral representation 242 shows, for example, the second band-pass filter signal 232 wherein additionally the local oscillator signal with a frequency $f_{LO1}$ is entered.

A mixer device 250 receives both the first band-pass filter signal 230 and the second band-pass filter signal 232 and further a local oscillator signal 252 of the frequency $f_{LO1}$. The mixer device 250 is implemented to mix the first band-pass filter signal 250 with the local oscillator signal 252 for obtaining a first intermediate frequency signal 260. Further, the mixer device 250 is implemented to mix the second band-pass filter signal 232 with the local oscillator signal 252 for obtaining a second intermediate frequency signal 262. Thus, the mixer device 250 is implemented to convert the first band-pass filter signal 230 to an intermediate frequency band with regard to its frequency. Further, the mixer device 250 is able to convert the second band-pass filter signal 232 to the intermediate frequency band with regard to its frequency.

In other words, an information content of the first usable frequency band is converted to an intermediate frequency band around an intermediate frequency $f_{IF1}$. Information content of the second usable frequency band is also converted to the intermediate frequency band around the frequency $F_{IF1}$. Conversion of the first usable frequency band and the second usable frequency band to the same intermediate frequency band around the frequency $F_{IF1}$ results by selecting the frequency $f_{LO1}$ such that the first usable frequency band and the second usable frequency band are at least partly image bands of each other, as has already been explained in detail with regard to FIG. 1.

Further, the receiver 200 comprises an intermediate frequency filter device 270, which is implemented to receive the first intermediate frequency signal 260 and the second intermediate frequency signal 262, and to generate a first filtered intermediate frequency signal 272 and a second filtered intermediate frequency signal 274 based on the above mentioned signals. Further, the receiver 200 comprises an analog/digital converter device 280, which is implemented to receive the first filtered intermediate frequency signal 272 and the second filtered intermediate frequency signal 274, and to generate, based thereon, a first digitized intermediate frequency signal 282 as well as a second filtered intermediate frequency signal 284.

For improving comprehensibility, a spectral representation 290 shows the first intermediate frequency signal 260. The first intermediate frequency signal 260 comprises an image 292 of the first usable frequency band 241 around the intermediate frequency $f_{IF1}$. A further spectral representation 294 shows the second intermediate frequency signal 262. The second intermediate frequency signal 262 comprises an image 296 of the second usable frequency band 243, which lies also around the intermediate frequency $f_{IF1}$, like the image 292 of the first usable frequency band.

The filter device 270 comprises, for example, a first band-pass filter or low-pass filter, which is implemented to receive the first intermediate frequency signal 260, and to pass the intermediate frequency band, which means a frequency range around the intermediate frequency $f_{IF1}$, in which the image 292 of the first usable frequency band 242 lies, and to suppress or attenuate, respectively, other frequency ranges. Thus, the filtered first intermediate frequency signal 272 comprises substantially the image 292 of the first usable frequency band 241.

Further, the filter device 270 comprises a second band-pass filter or low-pass filter, which is implemented to receive the second intermediate frequency signal 262, and to generate the second filtered intermediate frequency signal 274 based thereon. The second filter of the intermediate frequency filter device 270 is implemented to pass the image 296 of the second usable frequency band 243, and to attenuate or suppress, respectively, other frequency bands.

Further, it should be noted that the same as stated with regard to filter 130 applies to the filter 270.

Further, with regard to the analog/digital converter device 280, the statements made with regard to the analog/digital converter device 140 apply.

Further, for the local oscillator signal 252 and for a context between the frequency $f_{LO1}$ and the frequencies of the two usable frequency bands, the statements made with regard to the receiver 100 apply as well. In other words, the first usable frequency band 156 corresponds to the first usable frequency band 251, and the second usable frequency band 158 corresponds to the second usable frequency band 243. The local oscillator signal 122 corresponds to the local oscillator signal 252.

Figure 3A:
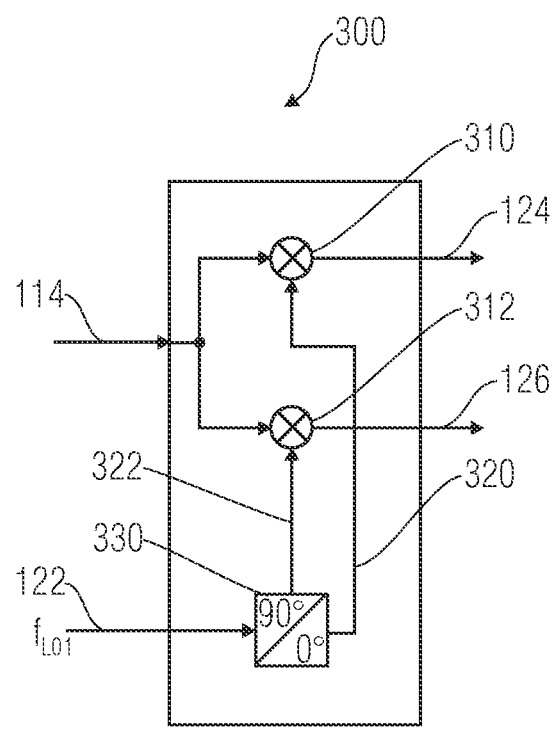
FIG. 3a is a block diagram of a mixer device for usage in a receiver according to FIG. 1.

Further, FIG. 3a shows a block diagram of a mixer assembly for usage in a receiver 100 according to FIG. 1. The mixer assembly according to FIG. 3a is designated by 300 in its entirety. The mixer assembly 300 comprises an inphase mixer 310 as well as a quadrature mixer 312. The inphase mixer or first mixer 310, respectively, receives the combination signal 314 and mixes the same with a local oscillator signal 320 for obtaining the first intermediate frequency signal 124. The quadrature mixer or second mixer 312, respectively, receives also the combination signal 114 and mixes the same with a second local oscillator signal 322 for obtaining the second intermediate frequency signal 126.

Further, the local oscillator signals 320, 322 have a phase shift of ideally 90° or in a range between 70° and 100°. This phase shift is generated, for example, by a phase-shift device 330, which receives the local oscillator signal 122 and generates the local oscillator signals 320, 322 based thereon.

Figure 3B:
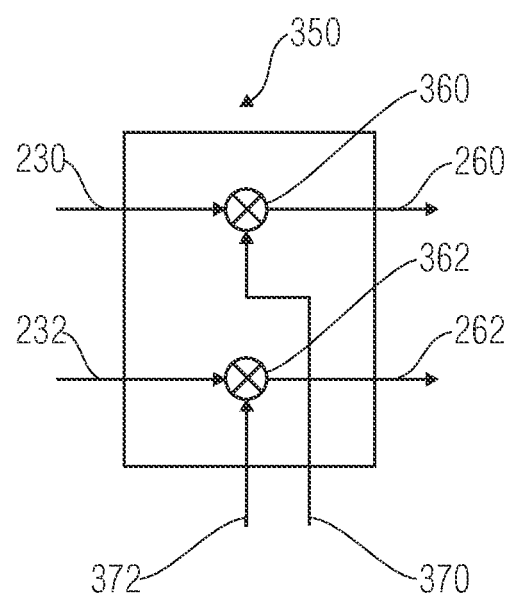
FIG. 3b is a block diagram of a mixer device for usage in a receiver according to FIG. 2.

FIG. 3b shows further a block diagram of a mixer device for usage in a receiver 200 according to FIG. 2. The mixer device according to FIG. 3b is designated by 350 in its entirety. The mixer device 350 comprises a first mixer 360, which receives the first band-pass filter signal 230 as well as a local oscillator signal 370, and generates the intermediate frequency signal 260 based thereon. Further, the mixer 350 comprises a second mixer 362, which receives the second band-pass filter signal 232 and a local oscillator signal 372 and generates the second intermediate frequency signal 262 based thereon. The local oscillator signals 370, 372 have the same frequency. A phase position of the local oscillator signals 370, 372 to each other can be freely selected. For example, a phase shift can exist in a range between 70° and 110° between the local oscillator signals 370, 372.

In other words, the mixer 350 is implemented such that the first intermediate frequency signal 260 is based on the first band-pass filter signal 230 and is decoupled from the second band-pass filter signal 232. The second intermediate frequency signal 262 is further based on the second band-pass filter signal 232 and is de-coupled from the first band-pass filter signal 230.

Figure 4:
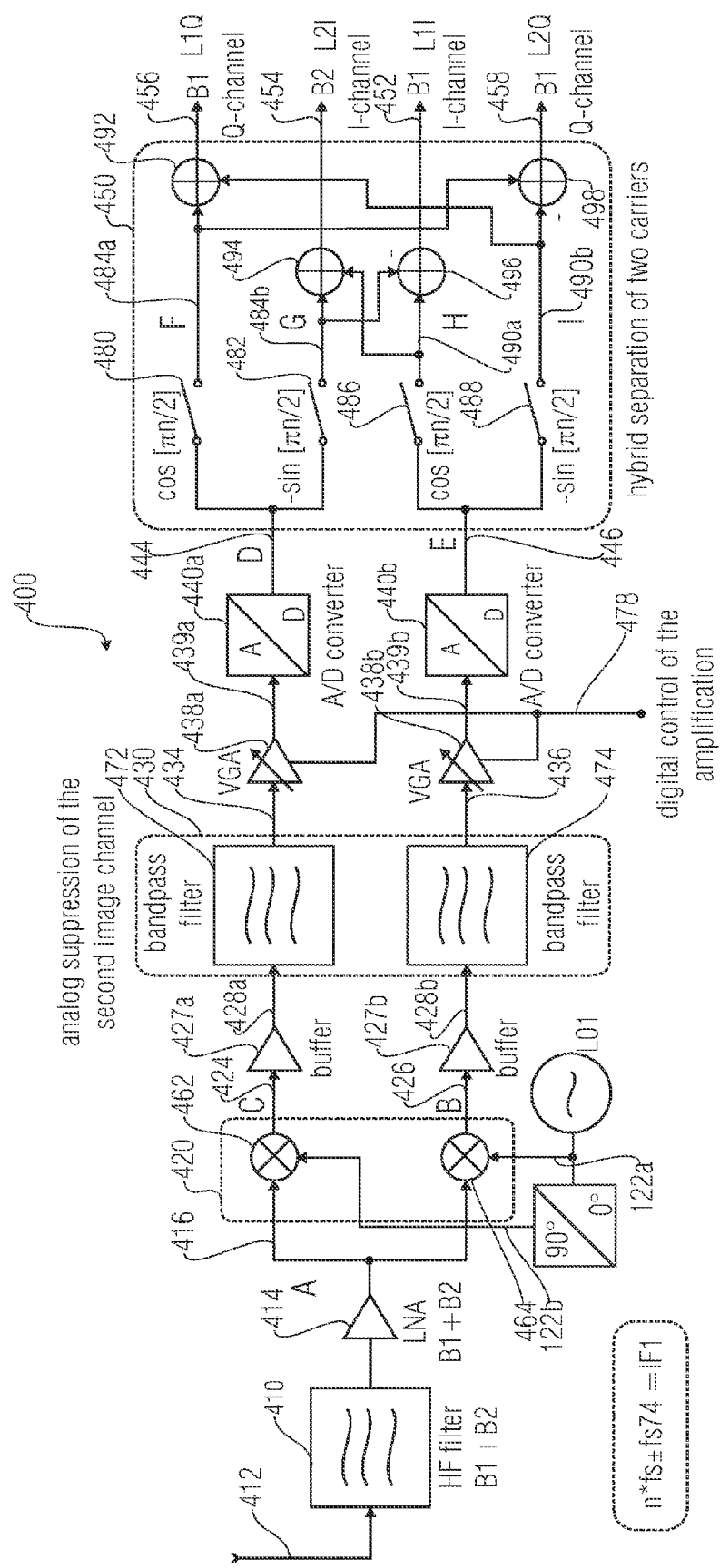
FIG. 4 is a block diagram of an inventive receiver according to an embodiment of the present invention.

FIG. 4 shows a block diagram of an inventive receiver according to an embodiment of the present invention. The receiver according to FIG. 4 is designated by 400 in its entirety. Apart from this, the receiver 400 according to FIG. 4 is similar to the receiver 100 according to FIG. 1. Thus, further, the statements made regarding the receiver 100 with regard to the usable frequency signals 156, 158, with regard to the selection of the frequency $f_{LO1}$ of the local oscillator signal as well as with regard to the passband of the filters of the intermediate frequency filter device 130 apply.

The receiver 400 comprises a band-pass filter or a band-pass filter device 410, respectively, which is implemented to receive a receiving signal 412. The receiving signal 412 can originate, for example, from a dual-band antenna, and comprises typically a signal portion in a first usable frequency band as well as a signal portion in a second usable frequency band, wherein the first usable frequency band and the second usable frequency band are spaced apart with regard to frequency, as it has already been explained with regard to FIG. 1.

In other words, the filter or high-frequency filter 410 is implemented to pass the first usable frequency band and the second usable frequency band, and to suppress or attenuate, respectively, a frequency range between the first usable frequency band and the second usable frequency band or other frequency ranges, respectively. In other words, the high-frequency filter 410 is a band-pass filter having two spaced-apart pass bands, wherein the first pass band comprises the first usable frequency band and the second pass band comprises the second usable frequency band.

Further, the receiver 400 comprises a low noise amplifier LNA 414, which is implemented to receive and amplify the output signal of the band-pass filter 410.

Thus, at one output of the amplifier 414 a combination signal 416 results, which is also designated by "A". A mixer device 420 receives the combination signal 416 as well as two oscillator signals 122a, 122b shifted by 90° to each other. The mixer device 420 generates a first intermediate frequency signal 424 as a first output signal, and a second intermediate frequency signal 426 as a second output signal. A first buffer 427a receives the first intermediate frequency signal 424 and generates a first buffered intermediate frequency signal 428a based thereon. Further, a second buffer 427b receives the second intermediate frequency signal 426 from the mixer device 420 and generates a second buffered intermediate frequency signal 428b based thereon. Further, the receiver 400 comprises an intermediate frequency filter device 430. The intermediate frequency filter device 430 receives the first buffered intermediate frequency signal 428a and provides a first filtered intermediate frequency signal 434 based thereon. Further, the intermediate frequency filter device 430 receives the second buffered intermediate frequency signal 428b and provides a second filtered intermediate frequency signal 436 based thereon. The receiver 400 further comprises two amplifiers 438a, 438b with variable gain (VGA). The first amplifier 438a receives the first filtered intermediate frequency signal 434 and provides a first filtered and amplified intermediate frequency signal 439a. The second amplifier 438b receives the second filtered intermediate frequency signal 436 and provides a second filtered and amplified intermediate frequency signal 439b. A first analog/digital converter 440a receives the first filtered and amplified intermediate frequency signal 439 and converts the same to a first digitized intermediate frequency signal 444. A second analog/digital converter 440b receives the second filtered and amplified intermediate frequency signal 439b and converts the same to a second digitized intermediate frequency signal 446. Further, the receiver 400 comprises a digital processing device 450, which receives the first digitized intermediate frequency signal 444 and the second digitized intermediate frequency signal 446. The digital processing device 450 further provides a first inphase output signal 452, which substantially comprising information content of the first usable frequency band, as well as a second inphase output signal 454, substantially comprising information content of the second usable frequency band. Further, the digital processing device 450 provides a first quadrature output signal 456, substantially comprising information content of the first frequency band, as well further a second quadrature output signal 458, substantially comprising the information content of the second usable frequency band.

Further, the mixer device 420 comprises a first mixer or inphase mixer 462 as well as a second mixer or quadrature mixer 464. The inphase mixer 462 receives the combination signal 416 as well as the local oscillator signal 122b and provides the first intermediate frequency signal 424 at its output. The second mixer 464 receives the combination signal 416 and the local oscillator signal 122a and provides the second intermediate frequency signal 426 at its output. The local oscillator signals 122a, 122b provided to the first mixer 462 and the second mixer 464 have a phase shift of ideally 90°. In reality, the phase shift between the local oscillator signals 122a, 122b can vary in a range between 70° and 110°. Apart from this, the frequency of the local oscillator signals 122a, 122b is the same, and is substantially determined by the frequency position of the usable frequency bands 156, 158 (c.f. FIG. 1). The frequency of the local oscillator signal 122a, 122b is symmetrical between the usable frequency bands 156, 158, as it has already been described above.

In a first embodiment, the intermediate frequency filter device 430 comprises a first band-pass filter 472 as well as a second band-pass filter 474. The first band-pass filter 472 is implemented to pass an intermediate frequency range around an intermediate frequency $F_{IF1}$, to which the first usable frequency band 156 and the second usable frequency band 158 are imaged by the mixer device 420, and to suppress or attenuate, respectively, other frequency ranges. Analogously, the second band-pass filter 474 is implemented to pass the intermediate frequency range around the intermediate frequency $f_{IF1}$, and to suppress or attenuate, respectively, other frequency ranges.

Details with regard to the selection of the pass-band frequency ranges of the band-pass filters 472, 474 will be discussed below.

In a further embodiment, the filter device 430 comprises a first low-pass filter instead of the first band-pass filter 472, as well as a second low-pass filter instead of the second band-pass filter 474, as will be discussed in more detail below.

The variable gain amplifiers 438a, 438b are implemented to receive the same control signals or a common control signal 478, respectively, for adjusting the amplification, which enable digital control of amplification. Thus, maximum symmetry of the assembly 400 is ensured, which provides for optimum separation of the information content of the usable frequency bands 156, 158.

Apart from this, the digital processing device 450 comprises a first cosine sampler 480 as well as a first sine sampler 482. The first cosine sampler 480 receives the first digitized intermediate frequency signal 440 as a time-discrete signal for a plurality of points in time with integer subsequent time indices n. The cosine sampler weights the first digitized intermediate frequency signal 444 with values defined in dependence on the time index n as cos [πn/2]. In other words, the cosine sampler 480 weights the first digitized intermediate frequency signal with a repeating sequence of values [1; 0; −1; 0] for indices n=0, n=1, n=2, n=3. The sine sampler 482, however, weights the samples of the first digitized intermediate frequency signal 444 with values defined according to −sin [πn/2]. Thus, the first cosine sampler 480 provides a sequence of values 484a based on the first digitized intermediate frequency signal 424, while the first sine sampler 482 provides a sequence of values 484b based on the first digitized intermediate frequency signal 444. In other words, the first sequence of values 484a results from the first digitized sampling signal 444 by weighting with a sequence of values [1; 0; −1; 0], while the second sequence of values 484b results from the first digitized intermediate frequency signal 444 by weighting with a sequence of values [0; −1; 0; 1]. In other words, the first sequence of values 484a corresponds substantially to a time discrete modulation of the first digitized intermediate frequency signal 444 with a cosine signal of the frequency $f_{S/4}$, wherein $F_S$ describes the sampling frequency of the first analog/digital conversion 440a. The second sequence of values 484b results by time discrete modulation of the first digitized intermediate frequency signal 444 by using a sinusoidal signal of the frequency $f_{S/4}$ scaled with the factor −1.

Further, the digital processing device 450 comprises a second cosine sampler 486, which receives the second digitized intermediate frequency signal 446 and generates a sequence of values 490a based thereon. Further, the digital processing device 450 comprises a second sine sampler 488, which receives the second digitized intermediate frequency sampler 488, which receives the second digitized intermediate frequency signal 446 and generates a fourth sequence of values 490b based thereon. The mode of operation of the second cosine sampler 486 corresponds to the mode of operation of the first cosine sampler 480, and the mode of operation of the second sine sampler 488 corresponds to the mode of operation of the first sine sampler 482.

Optionally, the cosine samplers 480, 486 can be replaced by modulators, which multiply the respective input signals 444, 446 with cosine signals of the frequency $f_{S/4}$ The sine samplers 482, 488 can also be replaced by modulators, which multiply the respective input signals with sine signals of the frequency $f_{S/4}$.

Further, the digital processing device 450 comprises a first combiner or adder 492, respectively, which is implemented to receive the first sequence of values 484a from the first cosine sampler 480 and the fourth sequence of values 490b from the second sine sampler 488 to additively combine the same with the same signs. Thus, the first combiner 492 provides the first quadrature output signal 456 as its output signal. A second combiner 494 receives the second sequence of values 484b provided by the first sine sampler 482 as well as the third sequence of values 490a provided by the second cosine sampler 486 and additively combines the mentioned sequences of values with the same sign. The second combiner 494 provides the second inphase output signal 454 as its output signal.

A third combiner or adder 496, respectively, receives the second sequence of values 484b from the first sine sampler 482 and subtracts the sequence of values 484b from the sequence of values 490a provided by the second cosine sampler 486. Thus, the third combiner 496 provides the first inphase output signal 452 as its output signal. A fourth combiner 498 receives the first sequence of values 484a from the first cosine sampler 480 and subtracts the fourth sequence of values 490b therefrom, which is provided by the second sine sampler 488. Thus, the fourth combiner 498 provides the second quadrature output signal 458 as its output signal.

Based on the above structural description, the mode of operation of the receiver 400 will be described in detail below. Here, first, processing during generation of the first digitized intermediate frequency signal 444 and the second digitized intermediate frequency signal 446 will be discussed.

Here, it is assumed first that the filters 472, 474 are band-pass filters. Further, it is assumed that the analog/digital converters 440a, 440b perform subsampling is performed by, and that frequency conversion is performed by the subsampling.

Further, it will be assumed below that the mixer device 420 images the first usable frequency band 156 and the second usable frequency band 158 to a range lying between a lower cutoff frequency $f_U$ and an upper cutoff frequency $f_O$ by down-mixing. For illustration purposes, reference is made to FIG. 1 and in particular to the spectral representations 160, 170, 180. It follows that the intermediate frequency $F_{IF1}$ lies between $f_U$ and $f_O$. Further, it will be assumed below that the frequency $F_U$ is larger than the sampling frequency $F_S$ of the analog/digital converters 440a, 440b.

Figure 6:
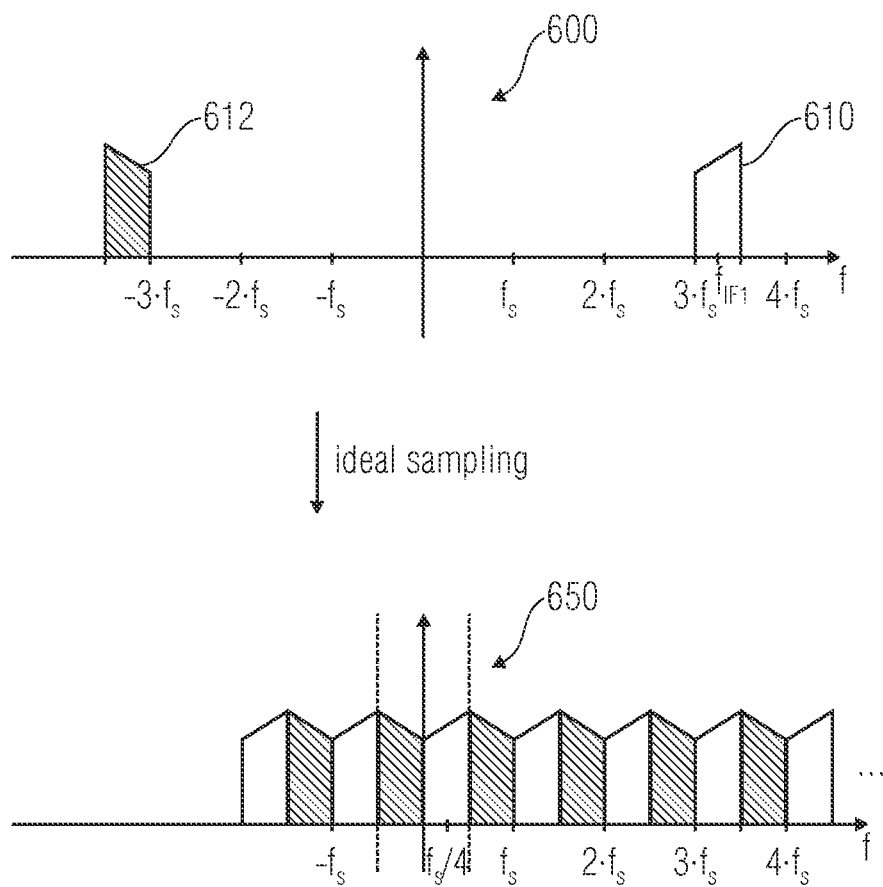
FIG. 6 is a spectral representation of the digitized intermediate frequency signals resulting from subsampling.

In one embodiment, in this case, the sampling frequency $f_S$ is selected such that an interval $[f_U; f_O]$ lies completely within an interval $[N \cdot f_S; (N+\frac{1}{2}) \cdot f_S]$. Thereby, N is an integer and higher than or equal to 1. Further it is assumed that the first band-pass filter 472 is a filter attenuating or suppressing, respectively, frequencies outside the interval $[n \cdot f_S; (N+\frac{1}{2}) \cdot f_S]$, and that the same has a pass band within the interval $[N \cdot f_S; (N+\frac{1}{2}) \cdot f_S]$, for example for passing the intermediate frequency range, which means the frequency interval $[f_U; f_O]$. Pass band and stop band of the band-pass filter can be defined in conventional manner. For example, a pass band is a range where attenuation or pass band attenuation of the band-pass filter, respectively, is by at least 3 dB higher than attenuation in the pass band (by at least 6 dB better at least 10 dB or 20 dB). For illustrating this, a spectral representation 600 of FIG. 6 shows a filtered intermediate frequency signal, for example the first filtered intermediate frequency signal 434. The following applies: N=3. In other words, the filtered intermediate frequency signal 434 shown in the graphical representation 600 has merely spectral portions in a range between $3 \cdot f_S$ and $3.5 \cdot f_S$.

In the shown case, the intermediate frequency $F_{IF1}$ is, for example $3.25 \cdot f_S$, wherein it is assumed that the intermediate frequency $F_{IF1}$ for example coincides with a center frequency of the images of the usable frequency bands in the filtered first intermediate frequency signal 434. By sampling the filtered intermediate frequency signal 434 (or the filtered and amplified intermediate frequency signal 439a) by the first analog/digital converter 440a, frequency conversion is performed by periodic continuation of the spectrum. Thus, a spectral representation 650 according to FIG. 6 shows a periodically continued spectrum, which results after sampling the spectrum shown in a spectral representation prior to analog/digital conversion. It shows that by subsampling during analog/digital conversion by the first analog/digital converter 440a, the frequency range between $3 \cdot f_S$ and $3.5 \cdot f_S$ is imaged to the frequency range between 0 and $\frac{1}{2} \cdot f_S$. The intermediate frequency $F_{IF1} = 3.25 \, f_S$ is thus imaged to $f_S/4$ in this example.

The sampling or subsampling, respectively, occurring during digital/analog conversion in the analog/digital converter 440 serves as frequency conversion, with appropriate selection of the intermediate frequency $f_{IF1}$ and further with the appropriate selection of the pass-band frequency band of the band-pass filter 472 (and/or the band-pass filter 474).

A respective frequency conversion occurs also in the second branch by the analog/digital converter 440b.

Further, it should be noted that a similar effect occurs under the prerequisite that the frequency interval $[f_U; f_O]$ is completely included in the interval $[(N-\frac{1}{2}) \cdot f_S; N \cdot f_S]$, wherein N is again a integer higher than or equal to 1. In this case, the band-pass filter 472 (and/or the band-pass filter 474) is implemented to suppress or attenuate, respectively, frequency ranges outside the interval $[(N-\frac{1}{2}) \cdot f_S; N \cdot f_S]$, as well as to pass the frequency interval $[f_U; f_O]$.

In an alternative embodiment, no subsampling is performed. Rather, in the alternative embodiment, low-pass filters are used instead of the band-pass filters 472, 474, which have an upper cutoff frequency, which is smaller or at the most equal to $f_S/2$.

Further, it should be noted that the above-described concept of subsampling by using band-pass filters 472, 474 and subsampling analog/digital converters 440a, 440b can also be used in connection with a receiver architecture according to FIG. 2. In this case, the filter device 270 comprises two band-pass filters corresponding to the band-pass filters 472, 474, and the analog/digital converter conversion 280 comprises analog/digital converters corresponding to the analog/digital converters 440a, 440b.

In connection with the receiver architecture according to FIG. 2, the digital processing device 450 can also be fully or partly omitted. Since separate branches are used for the two usable frequency bands according to the receiver architecture of the receiver 200, there is no need to separate the usable frequency bands in the digitized intermediate frequency signal 282, 284. Thus, in connection with the receiver architecture 200, the combiners 492, 494, 496, 498 can be optionally omitted.

In the following, the basic concept of the receiver 400 according to FIG. 4 will be briefly summarized again. Within the following statements, reference is made to FIG. 5, which describes a frequency plan of the receiver 400. In other words, FIG. 5 shows a schematic representation of a frequency process within the modified weaver architecture of the receiver 400.

Figure 5:
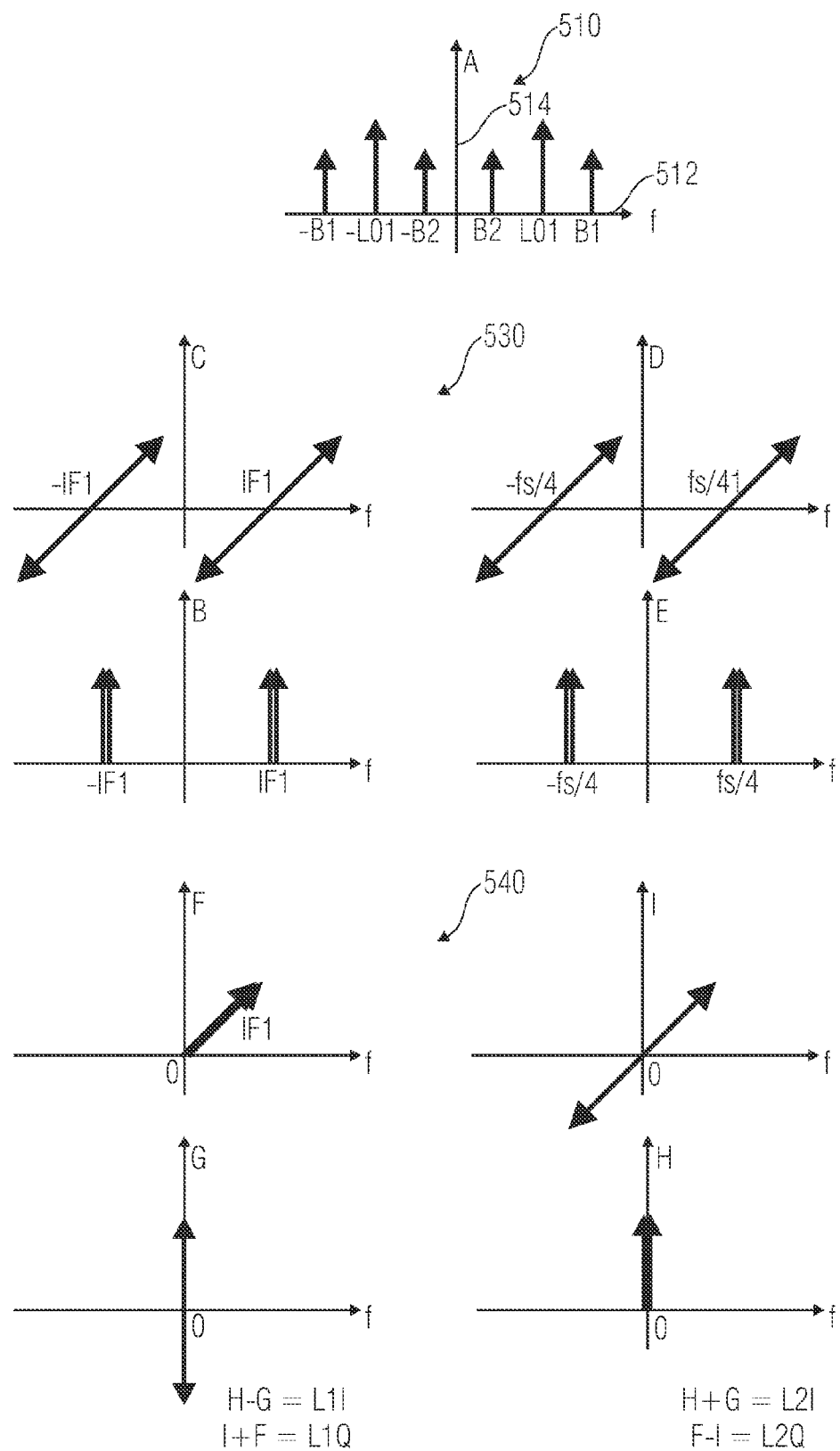
FIG. 5 is a frequency plan in an inventive receiver according to FIG. 4.

In summary, it can be said that FIG. 5 shows a simplified frequency conversion within the hybrid-modified weaver-mixer for image frequency suppression, while FIG. 5 shows the presented receiver architecture or the architecture of the presented broadband low intermediate frequency receiver, respectively.

With reference to FIG. 5, a first spectral illustration 510 shows the combination signal 416 (also designated by A). The frequency is plotted on an abscissa 512, while an ordinate 514 describes a spectral power density. B1 and B2 represent the desired bands or usable frequency bands, respectively. A first oscillator LO1 (or a frequency $f_{LO1}$ of the first oscillator, respectively) is in the center of both bands (or between the two bands, respectively).

Correspondingly, the bands or useful frequency bands B1, B2, respectively, are (at least partly) image bands of each other. Subsequently, frequency conversion for both bands B1, B2 can be performed by a single frequency synthesizer. The dual-band antenna providing the receiving signal 412, the high frequency filter or pre-selection filter 410, respectively, and the low-noise amplifier 414 (LNA) suppress interferers beside the bands, but effect no image band suppression. Band-pass filtering (by the band-pass filters 472, 474) after the first complex frequency conversion (by the mixer device or the complex mixer 420, respectively) is passive. After the variable gain (by the variable gain amplifiers 438a, 438b, which are also designated by VGA), the analog/digital converter (for example consisting of the first analog/digital converter 440a and the second analog/digital converter 440b) provides two functions: digitization and frequency conversion of the first intermediate frequency $IF_1$ (with frequency $f_{IF1}$) to a second intermediate frequency $IF_2 = F_{S/4}$. Here, $f_S$ represents the sampling frequency of the analog/digital converter (or the analog/digital converters 440a, 440b, respectively). For performing frequency conversion in such a manner it is advantageous that the sampling rate of the analog/digital converter (or the analog/digital converters 440a, 440b) and the first intermediate frequency IF1 fulfill the following equation:

$$N \times f_S \pm f_S/4 = IF_1$$

Here, N is a subsampling factor. In other words, the following holds:

$$N \times f_S + f_S/4 = IF_1$$

or $$N \times F_S - f_S/4 = IF_1$$

When N=0, no frequency conversion takes place. In this case, a low-pass filter (replacing the band-pass filters 472, 474) serves as anti-alias filter and second image-band suppressor. For $N \geq 1$, a band-pass filter may be used for both functions (which means as anti-alias filter and as second image-band suppressor).

The suppression of the second image band by the anti-alias filter (which means by the band-pass filters 472, 474 or by low-pass filters replacing the band-pass filters 472, 474 for N=0) is a distinctive feature of the inventive topology, because the second frequency conversion takes place by subsampling (by analog/digital converters 440a, 440b) after filtering (by the intermediate frequency filter device 430).

A decision, which filter option is used (using band-pass filters 472, 474 in the intermediate frequency filter device 430, or using low-pass filters instead of the band-pass filters 472, 474) depends on mutually conditional factors. Thus, when using a low-pass filter or two low-pass filters, respectively, implementation is easier. Further, when using a low-pass filter, group runtime change is smaller than when using a band-pass filter. One the other hand, the clock frequency of the analog/digital converter is maximum or higher than when using subsampling. When using a low-pass filter, the clock frequency (or the sampling frequency of the analog/digital converter, respectively) is at least twice as high as the highest bandwidth between the bands B1, B2. Thus, the decision (whether a low-pass filter or band-pass filter is to be used, and whether subsampling is to be performed) depends on the desired (receiving) bands and their frequency plan.

Subsampling offset by $f_S/4$ allows simple frequency conversion into a base band and perfect generation of real and imaginary portions for both bands. Thus, for example FIG. 5 shows in the spectral representation 530 the signals D and E in the second intermediate frequency IF2 or $f_{IF2}$, respectively, which is equal to $f_S/4$.

Here, the signal D corresponds to the first digitized intermediate frequency signal 444, and the signal E corresponds to the second digitized intermediate frequency signal 446. A further spectral representation 540 according to FIG. 5 shows signals F, G, H, and I in the base band. The signal F corresponds to the first sequence of values 484a, the signal G corresponds to the second sequence of values 484b, the signal H corresponds to the sequence of values 490a, and the signal I corresponds to the sequence of values 490b.

For the first inphase-output signal L1I (also designated by 452), the first quadrature-output signal L1Q (also designated by 456), the second inphase-output signal L2I (designated by 454) and the second quadrature-output signal L2Q (also designated by 458) the following relations hold:

$$L1I=H-G;$$

$$L1Q=I+F;$$

$$L2I=H+G;$$

$$L2Q=F-I.$$

Here, F is the output signal 484a of the first cosine sampler 480, G the output signal 484b of the first sine sampler 482, H the output signal 490a of the first cosine sampler 486, and I the output signal 490b of the first sine sampler 488.

The inventive receiver separates the bands or usable frequency bands B1 and B2, in the digital range. By this innovative stage (or by the innovative digital processing device 450 in combination with the intermediate frequency filter device 430 and the analog/digital converters 440a, 440b, respectively) three functions are realized at the same time with very little effort: frequency conversion to the base band, complex signal generation and separation of simultaneously received signals.

The described additional processing for actual separation of both bands (which is, for example, performed by the combiners 492, 494, 496, 498) is simple and necessitates minimum or low power compared to a complete analog mirror frequency suppression (for example when implementing the digital signal processing 450 in CMOS technology). Additionally, digital word width of the analog/digital converter (or the analog/digital converters 440a, 440b, respectively) is very low (between 2 and 4 bits), which keeps the complexity of the digital signal processing 450 low. An actual degree of suppression between the bands B1 and B2 is determined by amplitude and phase inaccuracies of the analog paths (which means, for example the mixer device 420, the buffers 427a, 427b, the filters 472, 474, and the amplifiers 438a, 438b). Due to the large number of the analog components of the complex down-mixing (for example the components 462, 464, 427a, 427b, 472, 474, 438a, 438b) suppression (or separation of the bands or usable frequency bands B1 and B2, respectively) is limited. The perfect quadrature generation in the digital part (based on the cosine samplers 480, 486 and the sine samplers 482, 488) still compensates an (comparatively large) inaccuracy in the analog part. Apart from this, a need for suppression (between the usable frequency bands B1 and B2) is relatively small, since the respective image band can be considered as thermal noise.

Further, it should be noted that an alternative topology of the receiver presented here consists of two separate antennas, pre-selection filters, and low-noise amplifiers (LNA). As long as both paths are not short-circuited prior to complex mixing, the mentioned three devices also provide image-signal suppression. In this case, no band separation is needed (within digital signal processing). Correspondingly, the four adders 492, 494, 496, 498 after the node (F, G, H, I) can be omitted. The alternative mentioned topology is, however, only useful when it is not possible to use dual-band antennas, pre-selection filters, and low-noise amplifiers (LNAs), for replacing the two paths by a single one.

In the following, the objects solved by the present invention will be briefly described. With the presented invention, future very broadband mobile receivers for high-precision positioning systems are possible, which necessitate a minimum number of analog components. Very compact and cost-effective receivers are a possible result.

For uniting a dual-band architecture and architectures for the reception of very large bandwidths, two image frequencies have to be broadband suppressed. The presented receiver places a single first oscillator (LO1) symmetrically between the two bands (or usable frequency bands B1, B2, 156, 158, respectively). Thereby, the simultaneously received bands (B1, B2; 156, 158) become image bands of each other. Due to a signal structure with distributed spectrum (also referred to as spread spectrum signal structure) the image bands overlaying the usable frequency bands can be seen as noise, which substantially eases the need for image-band suppression.

The inventive receiver architecture separates simultaneously received bands in the digital processing level (for example in the digital signal processing device 450). Due to this hybrid method, a number of analog components are at a minimum.

In the following, improvements and advantages provided by the present invention compared to conventional approaches will be described. In the inventive receiver topology, a number of analog components are at a minimum, since a separation of both received bands (for example the first usable frequency band B1, 156 and the second usable frequency band B2, 158) is performed in the digital range (for example in the digital signal processing device 450). This allows a compact and power-saving receiver. The digital signal processing device 450 can be realized, for example, with power-saving CMOS technology. Further, the inventive receiver or the inventive receiver topology, respectively, is particularly well suited for a receiver based on discrete components.

Further, the low-pass filter or the band-pass filter, respectively (472, 474) serves two purposes: the low-pass filter or band-pass filter, respectively, serves as anti-aliasing filter and as second image-band suppressor. This specific feature of the inventive receiver results from the double function of the analog/digital converter (440a or 440b, respectively): quantizer and second frequency converter by subsampling.

Due to the fact that the second frequency conversion takes place after the channel selection (by filters 472, 474), filtering also has the function of image-band suppression. This presents a large advantage since no analog mirror-band suppressor is necessitated for fulfilling that function. In contrary to current dual receivers, the inventive topology saves two image-band suppressors thanks to the hybrid separation of received bands and the suppression function of the channel-selection filters (for example the filters 472, 474).

Innovative digital signal conditioning (for example by the digital signal processing 450) fulfills three functions: frequency conversion to a base band, inphase (I) splitting and quadrature (Q) splitting for both bands (for example for the first usable frequency band B1, 156 and the second usable frequency band B2, 158) and separation of both bands. These functions can be realized extremely easy and in a power-saving manner by the specific frequency planning ($IF_2=f_S/4$ by subsampling) and by small word widths. Additionally, the presented topology can be easily converted to a single band receiver by power-management strategies. In this case, only half of the receiver is active. Thus, a selection can be made between a saving mode with less accuracy and an optimized dual mode, without this possibility increasing the original hardware complexity.

Figure 7A:
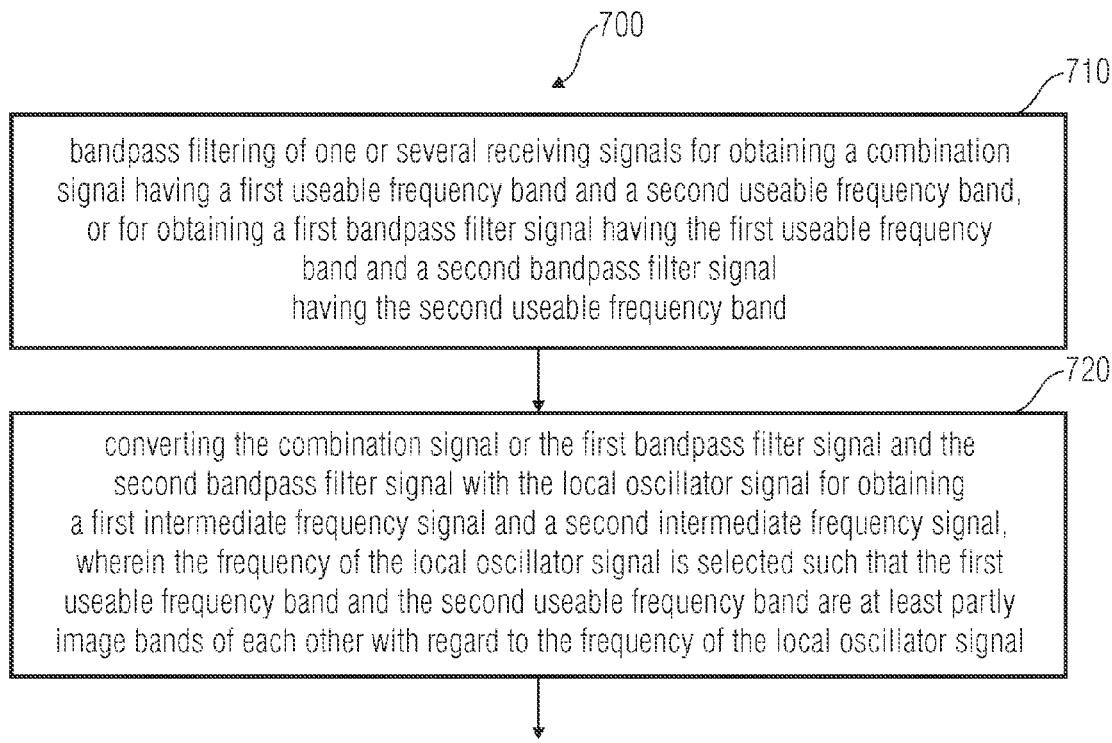
FIG. 7a is a first part of a flow diagram of an inventive method according to an embodiment of the present invention.
Figure 7B:
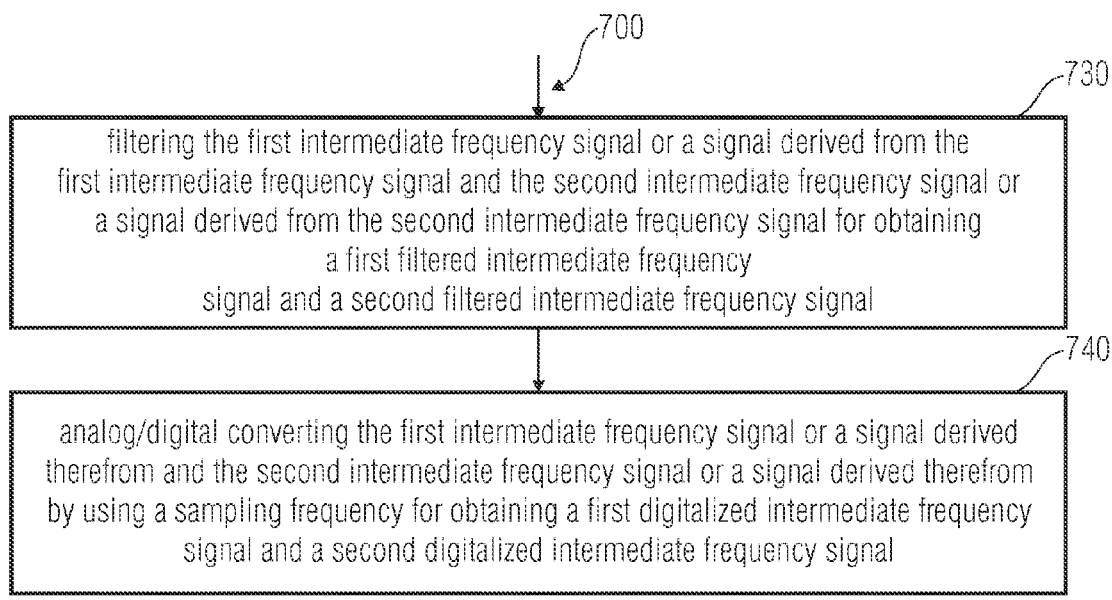
FIG. 7b is a second part of a flow diagram of an inventive method according to an embodiment of the present invention.

Further, the present invention provides a method for receiving a first usable frequency band and a second usable frequency band. FIGS. 7a and 7b show a flow diagram of the inventive method. The method according to FIGS. 7a and 7b is designated by 700 in its entirety. In a first step 710, the method comprises band-pass filtering of one ore several receiving signals, for obtaining a combination signal having a first usable frequency band and a second usable frequency band, or for obtaining a first band-pass filter signal having the first usable frequency signal and a second band-pass filter signal having the second usable frequency band. In a second step 720, the method 700 comprises converting the combination signal or the band-pass filter signal and the second band-pass filter signal by mixing with the local oscillator signal for obtaining a first intermediate frequency signal and a second intermediate frequency signal. The frequency of the local oscillator signal is selected such that the first usable frequency band and the second usable frequency band are at least partly image bands of each other with regard to the frequency of the local oscillator signal. Further, in a third step 730, the method 700 comprises filtering the first intermediate frequency signal or a signal derived from the first intermediate frequency signal, and the second intermediate frequency signal or a signal derived from the second intermediate frequency signal, for obtaining a first filtered intermediate frequency signal and a second filtered intermediate frequency signal. Further, in a fourth step 740, the method 700 comprises analog/digital converting of the first filtered intermediate frequency signal or a signal derived therefrom, and of the second filtered intermediate frequency signal or signal derived therefrom by using a single sampling frequency for analog/digital converting of the first intermediate frequency signal and the second intermediate frequency signal. Thereby, a first digitized intermediate frequency signal and a second digitized intermediate frequency signal are obtained.

Further, the method 700 can be extended by all those steps and features that have been described above with regard to the discussed inventive devices.

Further, it should be noted that a new and efficient topology for implementing a dual-band receiver is based on a common first intermediate frequency (IF). On the one hand this selection has the effect that both bands are image bands of one another. On the other hand, high-frequency band selection provides no image-band suppression, since both received bands are added after respective filtering and low-noise amplification. These two factors result in the need for a receiver architecture providing the image-band suppression. The suppression can be kept comparatively low, since the image band as distributed spectrum or spread spectrum, respectively, can be considered as thermal noise. This eases the integratability of the inventive architecture. For optimizing a bandwidth of a variable gain amplifier and a clock frequency of an analog/digital converter, it is desirable to set the bands at an intermediate frequency that approximately corresponds to half of the bandwidth of the bands. Thus, the first intermediate frequency is determined by a frequency distance between the bands, no matter how broad the bands are. The resulting first intermediate frequency is normally significantly higher than half of the bandwidth (of the usable frequency bands). An additional frequency conversion is advantageous for obtaining a second intermediate frequency. The additional frequency conversion has the disadvantage that the resulting image band also has to be suppressed.

This suppression can for example be realized by a complex active band-pass filter. The mentioned solution is here limited with regard to the bandwidth, since the power consumption of such a complex filtering increases heavily with the frequency. For that reason, small to medium bandwidths, approximately 2 to 5 MHz, are used for mobile receivers.

A further development of the mentioned receiver concept consists in an inventive usage of the intermediate frequency filter device 430, which obtains analog suppression of the second image channel, as well as further in the usage of the digital processing device 450, which can perform hybrid separation of two carriers.

Thus, the present invention presents a receiver architecture for maximally reducing devices needed for dual high-precision broadband receivers. The receiver architecture can be applied for simultaneously receiving two bands of a navigation system (e.g. of L1 and L2c of GPS, or L5 and L6 by Galileo), but also for a common reception of bands from different systems.

The inventive presented receiver with low IF (low IF receiver) separates both received bands by an innovative hybrid analog/digital mixer with image-frequency suppression. A digital part thus not only separates both received bands but also mixes into the base band and extracts a real and an imaginary portion of both signals. A second frequency conversion is given by subsampling by an analog/digital converter. The band-pass filter serves as anti-alias filter and second image-band frequency suppressor. The mentioned topology consists of a minimum number of analog devices and a single frequency synthesizer, which allows a compact and low-power design.

Thus, the present invention allows the construction of high-precision dual receivers for positioning systems. Thus, based on the present invention, for example a GPS dual receiver, a Galileo dual receiver, a Glonass dual receiver or GNSS dual receiver can be implemented.

Specific advantages are the minimum number of analog components allowing a compact and power-saving receiver. Further, the inventive concept is suitable for realizing a receiver based on discrete components. Power management allows to select single-band reception or dual-band reception.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A receiver for receiving a first usable frequency band and a second usable frequency band, wherein the usable frequency bands are spaced apart, comprising:
    a band-pass filter device for filtering one or several receiving signals, wherein the band-pass filter device is implemented to provide a combination signal comprising the first usable frequency band and the second usable frequency band;
    a mixer device for converting the combination signal with a local oscillator signal, whose frequency is selected such that the first usable frequency band and the second usable frequency band are at least partly image bands of each other with regard to the frequency of the local oscillator signal, for acquiring a first intermediate frequency signal and a second intermediate frequency signal;
    an intermediate frequency filter device for filtering the first intermediate frequency signal and the second intermediate frequency signal for acquiring a first filtered intermediate frequency signal and a second filtered intermediate frequency signal; and
    an analog/digital converter for analog/digital converting the first filtered intermediate frequency signal and the second filtered intermediate frequency signal by using a single sampling frequency for acquiring a first digitized intermediate frequency signal and a second digitized intermediate frequency signal),
    wherein the mixer device is implemented to mix the combination signal with the local oscillator signal for acquiring an inphase intermediate frequency signal as the first intermediate frequency signal, which is based on the combination signal, and in which information contents of the first usable frequency band and the second usable frequency band at least partly spectrally overlap, and
    for acquiring a quadrature intermediate frequency signal as the second intermediate frequency signal, which is based on the combination signal, and in which information contents of the first usable frequency band and the second usable frequency band at least partly spectrally overlap; and
    wherein the receiver further comprises a separation device, comprising;
    an inphase/quadrature splitting device, which is implemented to determine an associated inphase portion and an associated quadrature portion based on the first digitized intermediate frequency signal, and to determine an associated inphase portion and an associated quadrature portion based on the second digitized intermediate frequency signal;
    a first combiner, which is implemented to combine the inphase portion of the first digitized intermediate frequency signal with the quadrature portion of the second digitized intermediate frequency signal with same signs, for acquiring a quadrature-output signal substantially comprising the information content of the first usable frequency band;
    a second combiner, which is implemented to combine the quadrature portion of the first digitized intermediate frequency signal with the inphase portion of the second digitized intermediate frequency signal with same signs, for acquiring an inphase-output signal substantially comprising the information content of the second usable frequency band;
    a third combiner, which is implemented to combine the quadrature portion of the first digitized intermediate frequency signal with the inphase portion of the second digitized intermediate frequency signal with opposite signs, for acquiring an inphase-output signal substantially comprising the information content of the first usable frequency band; and
    a fourth combiner, which is implemented to combine the inphase portion of the first digitized intermediate frequency signal with the quadrature portion of the second digitized intermediate frequency signal with opposite signs, for acquiring a quadrature output signal substantially comprising the information content of the second usable frequency band),
    wherein the receiver is implemented such that the analog/digital converter device performs subsampling and that frequency conversion is performed by the subsampling.

2. The receiver according to claim 1, wherein the inphase/quadrature splitting device is implemented
    to acquire the inphase portion of the first digitized intermediate frequency signal in the base band,
    to acquire the quadrature portion of the first digitized intermediate frequency signal in the base band,
    to acquire the inphase portion of the second digitized intermediate frequency signal in the base band,
    to acquire the quadrature portion of the second digitized intermediate frequency signal in the base band.

3. The receiver according to claim 1, wherein the mixer device is implemented to mix the combination signal with the local oscillator signal for acquiring an inphase intermediate frequency signal as the first intermediate frequency signal, which is based on the combination signal, and in which information contents of the first usable frequency band and the second usable frequency band at least partly spectrally overlap, and
    for acquiring a quadrature intermediate frequency signal as the second intermediate frequency signal, which is based on the combination signal, and in which information contents of the first usable frequency band and the second usable frequency band at least partly spectrally overlap;
    the receiver further comprising a separation device, which is implemented to acquire a first output signal based on the first digitized intermediate frequency signal and the second digitized intermediate frequency signal, substantially comprising information content of the first usable frequency band, and in which information content of the second usable frequency band is attenuated or suppressed compared to the information content of the first usable frequency band, and
    to acquire a second output signal, substantially comprising information content of the second usable frequency band, and wherein information content of the first usable frequency band is attenuated or suppressed compared to the information content of the second usable frequency band;
    wherein the analog/digital converter device is implemented to convert the first filtered intermediate frequency signal or a signal derived therefrom by subsampling with regard to a frequency, and to convert the second filtered intermediate frequency signal or a signal derived therefrom with regard to a frequency, wherein the intermediate frequency filter device is implemented to act as an anti-alias filter for the analog/digital conversion.

4. The receiver according to claim 3, wherein the separation device comprises an inphase/quadrature splitting device, which is implemented to determine an associated inphase portion and an associated quadrature portion based on the first digitized intermediate frequency signal, and to determine an associated inphase portion and an associated quadrature portion based on the second digitized intermediate frequency signal; and wherein the separation device further comprises a combination device, which is implemented to acquire the first output signal by a first combination of the inphase portion or the quadrature portion of the first digitized intermediate frequency signal with the inphase portion or the quadrature portion of the second digitized intermediate frequency signal, and to acquire the second output signal by a second combination of the inphase portion or the quadrature portion of the first digitized intermediate frequency signal with the inphase portion or the quadrature portion of the second digitized intermediate frequency signal.

5. The receiver according to claim 1, wherein the frequency of the local oscillator signal is equal to an average value of a first carrier frequency in the first usable frequency band and a second carrier frequency in the second usable frequency band.

6. The receiver according to claim 1, wherein the band-pass filter device is implemented to receive a receiving signal, for attenuating the first usable frequency band and the second usable frequency band less than a frequency band lying between the first usable frequency band and the second usable frequency band, and to provide a combination signal comprising information content of the first usable frequency band and information content of the second usable frequency band;

wherein the mixer device is implemented to mix the combination signal with the local oscillator signal, for acquiring an inphase intermediate frequency signal as the first intermediate frequency signal, which is based on the combination signal, and in which information contents of the first usable frequency band and the second usable frequency band at least partly spectrally overlap, and for acquiring a quadrature intermediate frequency signal as the second intermediate frequency signal, which is based on the combination signal, and in which information contents of the first usable frequency band and the second usable frequency band at least partly spectrally overlap;

wherein the receiver further comprises a separation device, which is implemented to acquire a first output signal based on the first digitized intermediate frequency signal and the second digitized intermediate frequency signal, substantially comprising information content of the first usable frequency band, and in which information content of the second usable frequency band is attenuated or suppressed compared to the information content of the first usable frequency band, and to acquire a second output signal substantially comprising information content of the second usable frequency band, and in which information content of the first usable frequency band is attenuated or suppressed compared to the information content of the second usable frequency band.

7. The receiver according to claim 6, wherein the first mixer device comprises an inphase mixer implemented to generate the inphase intermediate frequency signal based on the combination signal, and a quadrature mixer, which is implemented to generate the quadrature intermediate frequency signal based on the combination signal, wherein the inphase mixer and the quadrature mixer are implemented to receive two local oscillator signals of the same frequency phase shifted to each other in a range between 70° and 110°.

8. The receiver according to claim 6, wherein the separation device comprises an inphase/quadrature splitting device, which is implemented to determine an associated inphase portion and an associated quadrature portion based on the first digitized intermediate frequency signal, and to determine an associated inphase portion and an associated quadrature portion based on the second digitized intermediate frequency signal; and wherein the separation device further comprises a combination device, which is implemented to acquire the first output signal by a first combination of the inphase portion or the quadrature portion of the first digitized intermediate frequency signal with the inphase portion or the quadrature portion, and to acquire the second output signal by a second combination of the inphase portion or the quadrature portion of the first digitized intermediate frequency signal with the inphase portion or the quadrature portion of the second digitized intermediate frequency signal.

9. The receiver according to claim 8, wherein the separation device comprises:

a first combiner, which is implemented to combine the inphase portion of the first digitized intermediate frequency signal with the quadrature portion of the second digitized intermediate frequency signal with same signs, for acquiring a quadrature output signal substantially comprising the information content of the first usable frequency band;

a second combiner, which is implemented to combine a quadrature portion of the first digitized intermediate frequency signal with an inphase portion of the second digitized intermediate frequency signal with same signs, for acquiring an inphase output signal substantially comprising the information content of the second usable frequency band;

a third combiner, which is implemented to combine a quadrature portion of the first digitized intermediate frequency signal with an inphase portion of the second digitized intermediate frequency signal with opposite signs, for acquiring an inphase output signal substantially comprising the information content of the first usable frequency band; and a fourth combiner, which is implemented to combine an inphase portion of the first digitized intermediate frequency signal with a quadrature portion of the second digitized intermediate frequency signal with opposite signs, for acquiring a quadrature output signal substantially comprising the information content of the second usable frequency band.

10. The receiver according to one of claim 6, wherein the separation device comprises a quadrature sampler as a first inphase/quadrature splitting device, which is implemented to weight, during generation of the inphase portion from the first digitized intermediate frequency signal, subsequent samples of the first digitized intermediate frequency signal with a sequence of values [+A; 0; −A; 0] or a sequence of values proportional thereto, and to weight, during generation of the quadrature portion from the first digitized intermediate frequency signal, subsequent samples of the first digitized intermediate frequency signal with a sequence of values [0; −A; 0; +A] or a sequence of values proportional thereto;
wherein the separation device comprises a second quadrature sampler as a second inphase/quadrature splitting device, which is implemented to weight, during generation of the inphase portion from the second digitized intermediate frequency signal, subsequent samples of the second digitized intermediate frequency signal with a sequence of values [+A; 0; −A; 0] or a sequence of values proportional thereto, and
to weight, during generation of the quadrature portion from the second digitized intermediate frequency signal, subsequent samples of the second digitized intermediate frequency signal with a sequence of values [0; −A; 0; +A] or a sequence of values proportional thereto, wherein A≠0.

11. The receiver according to claim 1, wherein the frequency of the first local oscillator signal and the sampling frequency are selected such that in the first digitized intermediate frequency signal, a spectral image of the first usable frequency band, which is the lowest with regard to frequency, extends around an intermediate frequency, which is equal to a quarter of the sampling frequency.

12. The receiver according to claim 1, wherein the intermediate frequency filter device comprises a low-pass filter with a cutoff frequency less than or equal to one half of the sampling frequency.

13. The receiver according to claim 1, wherein the sampling frequency is between 1.8-fold and 2.2-fold of an amount of a frequency difference between a first carrier frequency in the first usable frequency band and a second carrier frequency in the second usable frequency band.

14. The receiver according to claim 1, wherein the sampling frequency is selected such that an image of the first usable frequency band generated by the mixer device lies within a frequency interval [N·$f_S$; (N+½)·$f_S$], and that an image of the second usable frequency band generated by the mixer device lies within the frequency interval [N·$f_S$; (N+½)·$f_S$],
wherein N≧1, and
wherein the intermediate frequency filter device comprises a band-pass filter, which is implemented to pass at least part of a frequency interval [N·$f_S$; (N+½)·$f_S$] to which the first usable frequency band and the second usable frequency band are imaged by the mixer device, and to attenuate frequencies outside the frequency interval [N·$f_S$; (N+½)·$f_S$].

15. The receiver according to claim 1, wherein the sampling frequency is selected such that an image of the first usable frequency band generated by the mixer device lies within a frequency interval [(N−½)·$f_S$; N·$f_S$], and that an image of the second usable frequency band generated by the mixer device lies within the frequency interval [(N−½)·$f_S$; N·$f_S$],
wherein N≧1, and
wherein the intermediate frequency filter device comprises a band-pass filter, which is implemented to pass at least part of a frequency interval [(N−½)·$f_S$; N·$f_S$] to which the first usable frequency band and the second usable frequency band are imaged by the mixer device, and to attenuate frequencies outside the frequency interval [(N−½)·$f_S$; N·$f_S$].

16. The receiver according to claim 1, wherein the analog/digital converter device is implemented to convert the first filtered intermediate frequency signal or a signal derived therefrom by subsampling with regard to a frequency, and to convert the second filtered intermediate frequency signal or a signal derived therefrom with regard to a frequency, wherein the intermediate frequency filter device is implemented to act as anti-alias filter for analog/digital conversion.

17. The receiver according to claim 1, wherein the receiver is implemented such that a center frequency of a spectral image of the first usable frequency band or a center frequency of a spectral image of the second usable frequency band in the first digitized intermediate frequency signal deviates by 25% at the most from half of a maximum of a bandwidth of the first usable frequency band and a bandwidth of the second usable frequency band.

18. The receiver according to claim 1, wherein the mixer device is an analog mixer device.

19. The receiver according to claim 1, wherein the receiver further comprises a dual-band antenna, which is implemented to receive the two different usable frequency bands, wherein the usable frequency bands are spaced apart with regard to frequency.

20. The receiver according to claim 1, wherein the mixer device is implemented to image a first carrier frequency in the first usable frequency band to a first intermediate frequency fIF1, so that the following applies:

$$N·f_S+f_S/4=f_{IF1}$$

or $$N·f_S-f_S/4=f_{IF1},$$

wherein N≧1, and wherein $f_S$ is the sampling frequency.

21. The receiver according to claim 1, wherein the mixer device is implemented to image a second carrier frequency in the second usable frequency band to a first intermediate frequency $f_{IF1}$, so that the following applies:

$$N·f_S+f_S/4=f_{IF1}$$

or $$N·f_S-f_S/4=f_{IF1},$$

wherein N≧1, and wherein $f_S$ is the sampling frequency.

22. A method for receiving a first usable frequency band and a second usable frequency band, wherein the usable frequency bands are spaced apart, comprising:
band-pass filtering of one or several receiving signals for providing a combination signal comprising the first usable frequency band and the second usable frequency band;
converting the combination signal with a local oscillator signal, whose frequency is selected such that the first usable frequency band and the second usable frequency band are at least partly image bands of each other with regard to the frequency of the local oscillator signal, for acquiring a first intermediate frequency signal and a second intermediate frequency signal;
filtering the first intermediate frequency signal and the second intermediate frequency signal for acquiring a first filtered intermediate frequency signal and a second filtered intermediate frequency signal; and
analog/digital converting the first filtered intermediate frequency signal and the second filtered intermediate frequency signal by using a single sampling frequency for acquiring a first digitized intermediate frequency signal and a second digitized intermediate frequency signal),
wherein analog/digital converting comprises subsampling, such that frequency conversion is performed by the subsampling;

wherein converting the combination signal with the local oscillator signal comprises mixing the combination signal with the local oscillator signal, for acquiring an inphase intermediate frequency signal as the first intermediate frequency signal, which is based on the combination signal, and in which information contents of the first usable frequency band and the second usable frequency band at least partly spectrally overlap, and for acquiring a quadrature intermediate frequency signal as the second intermediate frequency signal, which is based on the combination signal, and in which information contents of the first usable frequency band and the second usable frequency band at least partly spectrally overlap; and the method further comprising:

combining the inphase portion of the first digitized intermediate frequency signal with the quadrature portion of the second digitized intermediate frequency signal with same signs, for acquiring a quadrature-output signal substantially comprising the information content of the first usable frequency band;

combining the quadrature portion of the first digitized intermediate frequency signal with the inphase portion of the second digitized intermediate frequency signal with same signs for acquiring an inphase-output signal, substantially comprising the information content of the second usable frequency band;

combining the quadrature portion of the first digitized intermediate frequency signalwith the inphase portion of the second digitized intermediate frequency signal with opposite signs, for acquiring an inphase-output signal substantially comprising the information content of the first usable frequency band; and combining the inphase portion of the first digitized intermediate frequency signal with the quadrature portion of the second digitized intermediate frequency signal with opposite signs, for acquiring a quadrature-output signal substantially comprising the information content of the second usable frequency band.

23. The method according to claim 22, wherein during converting, the combination signal is mixed with the local oscillator signal for acquiring an inphase intermediate frequency signal as the first intermediate frequency signal, which is based on the combination signal, and in which information contents of the first usable frequency band and the second usable frequency band at least partly spectrally overlap, and for acquiring a quadrature intermediate frequency signal as the second intermediate frequency signal, which is based on the combination signal, and in which information contents of the first usable frequency band and the second usable frequency band at least partly spectrally overlap, wherein analog/digital converting comprises frequency converting the first filtered intermediate frequency signal or signal derived therefrom by subsampling, and frequency converting the second filtered intermediate frequency signal or a signal derived therefrom, wherein filtering the first intermediate frequency signal acts as anti-alias filtering for analog/digital conversion; and the method further comprising:

acquiring a first output signal substantially comprising information content of the first usable frequency band, and in which information content of the second usable frequency band is attenuated or suppressed compared to the information content of the first usable frequency band, based on the first digitized intermediate frequency signal and the second digitized intermediate frequency signal; and acquiring a second output signal substantially comprising information content of the second usable frequency band, and in which information content of the first usable frequency band is attenuated or suppressed compared to information content of the second usable frequency band, based on the first digitized intermediate frequency signal and the second digitized intermediate frequency signal.

* * * * *

UNITED STATES PATENT AND TRADEMARK OFFICE
CERTIFICATE OF CORRECTION

PATENT NO.       : 8,467,753 B2                                      Page 1 of 1
APPLICATION NO.  : 12/306295
DATED            : June 18, 2013
INVENTOR(S)      : Carrera et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1020 days.

Signed and Sealed this

Eighth Day of September, 2015

Michelle K. Lee
*Director of the United States Patent and Trademark Office*